(12) United States Patent
Kiro et al.

(10) Patent No.: US 8,059,154 B1
(45) Date of Patent: Nov. 15, 2011

(54) SYSTEMS AND METHODS FOR AUTOMATIC CAMERA CALIBRATION

(75) Inventors: Shmuel Kiro, Rehovot (IL); Itsik Horovitz, Holon (IL)

(73) Assignee: Verint Systems Ltd., Herzilya, Pituach (IL)

( * ) Notice: Subject to any disclaimer, the term of this patent is extended or adjusted under 35 U.S.C. 154(b) by 472 days.

(21) Appl. No.: 12/245,836

(22) Filed: Oct. 6, 2008

(51) Int. Cl.
*H04N 17/00* (2006.01)
(52) U.S. Cl. ........................................................ 348/184
(58) Field of Classification Search .................... 348/184
See application file for complete search history.

(56) References Cited

U.S. PATENT DOCUMENTS

| | | | | |
|---|---|---|---|---|
| 2003/0004694 A1* | 1/2003 | Aliaga et al. | | 703/2 |
| 2004/0233290 A1* | 11/2004 | Ohashi et al. | | 348/187 |
| 2007/0003141 A1* | 1/2007 | Rittscher et al. | | 382/181 |
| 2008/0075358 A1* | 3/2008 | Yu et al. | | 382/154 |
| 2008/0144926 A1* | 6/2008 | Hattori et al. | | 382/154 |
| 2008/0317379 A1* | 12/2008 | Steinberg et al. | | 382/275 |
| 2009/0037039 A1* | 2/2009 | Yu et al. | | 701/19 |
| 2009/0252421 A1* | 10/2009 | Stentiford | | 382/209 |

* cited by examiner

*Primary Examiner* — James Hannett
(74) *Attorney, Agent, or Firm* — McKeon, Meunier, Carlin & Curfman

(57) ABSTRACT

Camera calibration for a particular camera is automated based on line segments derived from historical data of images passing within that camera's view. Objects having a stable history of orientation are selected for conversion to line segments. A model is derived that fits the way most of the objects behave. The model is specific for the camera supplying the historical data and is specific for the location and position of the camera in that location. The model is able to predict how an object would appear at different locations in the scene and can be applied to data collected by that camera in that location in the future. Outputs include internal camera parameters, a vertical vanishing point and horizontal vanishing line, an equation of the floor and height of objects touching the floor relative to the average person height in the calibration video data.

18 Claims, 3 Drawing Sheets

SYSTEMS AND METHODS FOR AUTOMATIC CAMERA CALIBRATION

TECHNICAL FIELD

The present disclosure is generally related to camera calibration, and more particularly, is related to automatic calibration of cameras based on developing a model of image data.

BACKGROUND

When a camera captures an image, light from a three-dimensional scene is focused and captured on a two dimensional image plane. Thus, each pixel on the image plane corresponds to a column of light from the original scene. While in an ideal pinhole camera, a simple projection matrix may be sufficient for this calculation, in practice, errors resulting from misaligned lenses and deformations in the structure of the lenses can result in complex distortions in the final image.

Camera calibration includes the process of determining the internal camera geometric and optical characteristics (intrinsic parameters) and/or the three-dimensional position and orientation of the camera frame relative to a certain world coordinate system (extrinsic parameters). In many cases, the overall performance of the camera system depends on the accuracy of the camera calibration.

Several methods for geometric camera calibration are known. One approach minimizes a nonlinear error function. A camera projection matrix is derived from the intrinsic and extrinsic parameters of the camera, and is often represented by a series of transformations; e.g., a matrix of camera intrinsic parameters, a rotation matrix, and a translation vector. The camera projection matrix can be used to associate points in a camera's image space with locations in three-dimensional world space.

SUMMARY

Camera calibration is automated based on line segments derived from historical data of images of objects passing within the camera view. Objects having a stable history of orientation are selected (e.g., objects which are vertical and which remain relatively vertical are selected or objects which are horizontal and which remain relatively horizontal are selected, for example). A model may be derived that fits the way most of the objects behave. The model is used to predict how an object would appear at different locations in the scene and may be applied to future video data. In addition to calculating camera calibration parameters, the model may be used to find the location of an object or subject relative to the scene.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Camera calibration is a time-consuming process. In accordance with aspects of the subject matter disclosed herein, camera calibration is automated by creating a model that fits most of the data in a historical video. The model is specific to the camera supplying the historical data and to a fixed location and position of the camera in the location. (Extrinsic parameters are fixed or unchanging.) The model is created by extracting line segments from the historical video, where the line segments are created by creating a line from top to bottom of a vertical object moving through the image area or by creating a line from side to side of a horizontal object moving through the image area. Objects having a stable history of orientation are selected (e.g., a vertical object that remains substantially vertical or a horizontal object that remains substantially horizontal). A model is derived that fits the way most of the objects behave. The model is able to predict how an object would appear at different locations in the scene and can be applied to future data collected by the camera. In addition to calculating camera calibration parameters, the model may be used to find the location of an object or subject relative to the scene or more particularly, to the scene floor.

Figure 1:
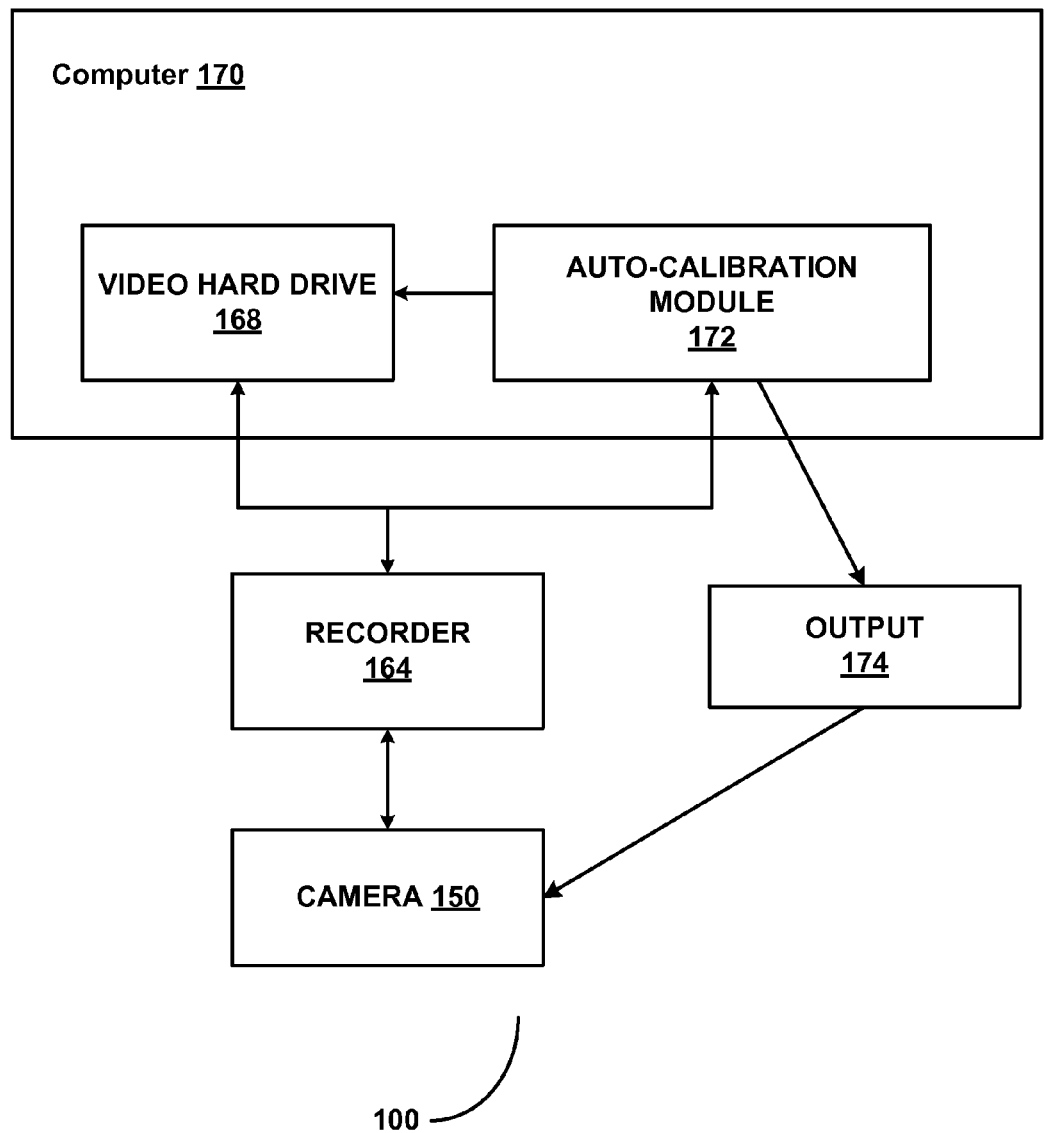
FIG. 1 is a block diagram that illustrates a system for automatic camera calibration in accordance with aspects of the subject matter disclosed herein.

FIG. 1 is a block diagram of an example of a system 100 for automatic camera calibration, in accordance with aspects of the subject matter disclosed herein. System 100 may reside in part on a computer 170. Computer 170 may be a computer such as the one described below with respect to FIG. 3. System 100 may include one or more of the following: one or more video monitoring devices, such as camera 150, to be calibrated, a recorder 164, one or more stable storage devices such as data storage device 168 for recording the video (e.g., a hard drive, etc.), and an auto-calibration module 172. It will be appreciated that although FIG. 1 shows computer 170, auto-calibration module 172, stable storage device 168, etc., as existing external to recorder 164, one, some, or all of these elements may be internal to recorder 164. Input to auto-calibration module 172 may be calibration video data (e.g., a movie) from a camera 150 or other video monitoring device and output 174 may include one or more of: internal camera parameters, a vertical vanishing point and horizontal vanishing line, an equation of the floor and height of objects touching the floor relative to the average person height in the calibration video data.

Video monitoring devices such as camera 150 may be a camera, a camcorder, a video camera, a fixed or a pan, tilt and zoom camera, a closed circuit television camera, an analog or digital camera, or any type of camera or image acquisition device known or developed in the future. A video monitoring device such as camera 150 may be an analog or digital device. The video data captured by camera 150 may be collected by recorder 164. If the data captured by the video monitoring device is analog data, the data may be converted from analog to digital form by recorder 164. Audio may also be captured by the video monitoring device. Recorder 164 may persist the data captured by one or more video monitoring devices such as camera 150 to stable storage or may transfer the video data to auto-calibration module 172 for storage. A video monitoring device such as a camera 150 may be fixed in a particular position in a particular location so that external parameters are unchanging. The camera 150 may remain in the fixed position in the location for an interval of time such as a number of hours or days. Camera 150 may detect objects within its range of view. Camera 150 may continue to collect video data until a majority of points within the field of view of the camera 150 are occupied at one point or another by a detected object.

Recorder 164 may be a digital video recorder (DVR) or personal video recorder (PVR) that records video in a digital format to a storage device or other memory medium within a device. The recorder may record CCTV surveillance data. A recorder 164 configured for physical security applications may record video signals from closed circuit television cameras for detection and documentation purposes. Audio may also be recorded. A CCTV recorder may provide advanced functions including video searches by event, time, date and camera. A recorder 164 may provide customizable control over quality and frame rate allowing disk space usage to be optimized. A recorder 164 may be set to overwrite the oldest security footage should the disk become full. In some recorder security systems remote access to security footage using a PC can also be achieved by connecting the recorder 164 to a LAN network or the internet (not shown).

Recorder 164 may be PC based or embedded. The architecture of a PC-based recorder is a personal computer with video capture cards designed to capture video images. An embedded type recorder may be specifically designed as a digital video recorder with its operating system and application software contained in firmware or read only memory.

In operation, recorder 164 may receive video data to be used for calibration of a video monitoring device from the video monitoring device to be calibrated. An example of a video monitoring device may be camera 150. The recorder 164 may store the received video data on one or more stable storage devices such as stable storage device 168. Auto-calibration module 172 may receive the video data from recorder 164 or from stable storage device 168. Auto-calibration module 172 may convert the video data (e.g., a movie in which moving objects pass through the scene) into a set of object lines. Each of the object lines may be associated with a length and an orientation. For example, an object that is a person may be represented by a line segment that extends from the head of the person to the foot of the person. Similarly, a horizontal object may be represented by a line segment that extends from side to side. Objects in the video data may be tracked. In accordance with some aspects of the subject matter disclosed herein, only moving objects may be selected to be tracked. The size of the object and the orientation of the object may be calculated by tracking the movement of the object as it progresses through the field of view of the camera or other video monitoring device.

Orientation may be calculated using second order Moments as follows:

$$\theta = \frac{1}{2}\tan^{-1}\left(\frac{2 \cdot M_{11}}{M_{20} - M_{02}}\right)$$

Objects at the edges of the image may be excluded from conversion to line segments collection. For each line object, length, orientation, original object index and time may be stored. Certain morphologic operations such as but not limited to hole-filling and simple connectivity may be performed beforehand to improve the accuracy of a calculated angle.

A vanishing point may be calculated. In accordance with some aspects of the subject matter disclosed herein, the vanishing point may be calculated using the RANSAC ("RANdom SAmple Consensus") algorithm. RANSAC is an iterative method to estimate parameters of a mathematical model from a set of observed data, which contains outliers.

The RANSAC algorithm assumes that the data consists of "inliers", i.e., data whose distribution can be explained by some set of model parameters, and "outliers" which are data that do not fit the model. The data may also be subject to noise. The outliers can arise because of extreme values of the noise, from erroneous measurements or from incorrect hypotheses about the interpretation of data. The RANSAC algorithm also may assume that given a (typically small) set of inliers, there exists a procedure that can estimate the parameters of a model that optimally explains or fits this data.

To calculate a first vanishing point using the RANSAC algorithm, a random subset (e.g., two objects converted into line segments, called line objects) of the original set of objects may be selected. A vanishing point of the selected subset may be determined. Each of the other line objects in the original set of objects may be tested against the first vanishing point. If the first vanishing point also fits a next-tested line object, that line object may be counted as a potential good data object for that vanishing point. If a predetermined or configurable number or proportion of objects fit the first vanishing point, the first vanishing point may be selected as the vanishing point for that set of objects. Alternatively, the vanishing point may be re-estimated a predetermined or configurable number of times by selecting the predetermined or configurable number of random subsets, recalculating a new vanishing point and testing the new vanishing point against the other objects in the original set. This may be repeated a predetermined or configurable number of times and the vanishing point to which the most data objects fit may be selected as the final selected vanishing point for the set of objects. The error of the data objects that fit the vanishing point may also be calculated or estimated.

The first approximation of a horizontal vanishing line may be calculated. For pairs of object lines, the intersection of lines passing through the tops of the lines and the bottoms of the lines or the right hand sides of the lines and the left hand sides of the lines may be computed. The line objects chosen may be ones that originated from the same object so that the actual height or length is constant. Different objects may have different heights or lengths. A line passing through these intersection points may be defined using the Hough transform algorithm or by least squares. The line so defined may be selected to be the vanishing line.

The Hough transform is a feature extraction technique that finds imperfect instances of objects within a certain class of shapes by a voting procedure. The voting procedure is carried out in a parameter space, from which object candidates are obtained as local maxima in an accumulator space that is explicitly constructed by the algorithm for computing the Hough transform.

A first approximation of camera internal parameters may be determined. A calibration matrix K may be defined as:

$$K = \begin{pmatrix} f_x & 0 & -p_x \\ 0 & f_y & -p_y \\ 0 & 0 & 1 \end{pmatrix}$$

The image of absolute conic w is related with K as follows:
$\omega = (K*K')^{-1}$.

Vanishing points v, w of perpendicular lines are related by (v, ω*w)=0 where (,) denotes the inner product. The vanishing point v and the direction of the vanishing line l are related by l=ω·v or l⊗(ω·v)=0.

Then, w may be represented as a homogeneous k-vector Ω. A matrix A may be formed so that the constraints are written in the form A*Ω=0; This system may be solved by singular value decomposition (SVD) to determine Ω and therefore ω. The Cholesky decomposition of $\omega^{-1}$ may be used in order to obtain K.

The equation of the floor and of the internal camera parameters may be determined as followed. A plane equation is defined by four parameters. Three of the four parameters are normal to the plane and one of the parameters is the offset. The normal direction is ω*v where ω is the image of absolute conic and v is the vertical vanishing point. The first approximation of the fourth parameter can be obtained from an approximate distance of the camera or other video monitoring device to the floor.

A system of equations expressing the square length of an object line may be set up to determine the coefficients of the equation of the plane and the internal camera parameters. To establish the system of equations, the world coordinates (co-ordinate systems that describe the physical coordinates associated with the camera) may be expressed as image coordinates by back projection and equation of the plane. Orthogonality constraints (vertical object lines are orthogonal to horizontal and constraints of the form l⊗(ω·v)=0) may be added. The system may be solved by non-linear constrained minimization.

Figure 2A:
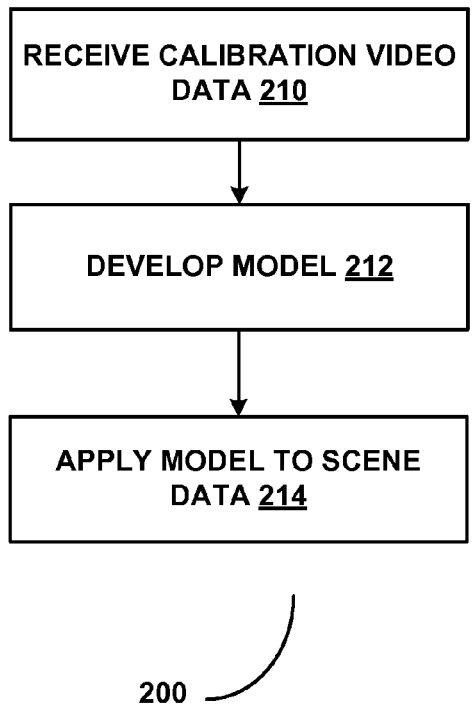
FIG. 2a illustrates an example of a method of automatic camera calibration in accordance with aspects of the subject matter disclosed herein.

FIG. 2a illustrates a method of automatic camera calibration in accordance with aspects of the subject matter disclosed herein. At 210, calibration video data from a video monitoring device or camera to be calibrated may be received by an auto-calibration module such as auto-calibration module 172 of FIG. 1. At 212 a model may be developed for the camera to be calibrated for the particular location in which the camera is located based on the calibration video data. At 214, the developed model may be applied to video data captured by the calibrated camera in the location for which the camera was calibrated.

Figure 2B:
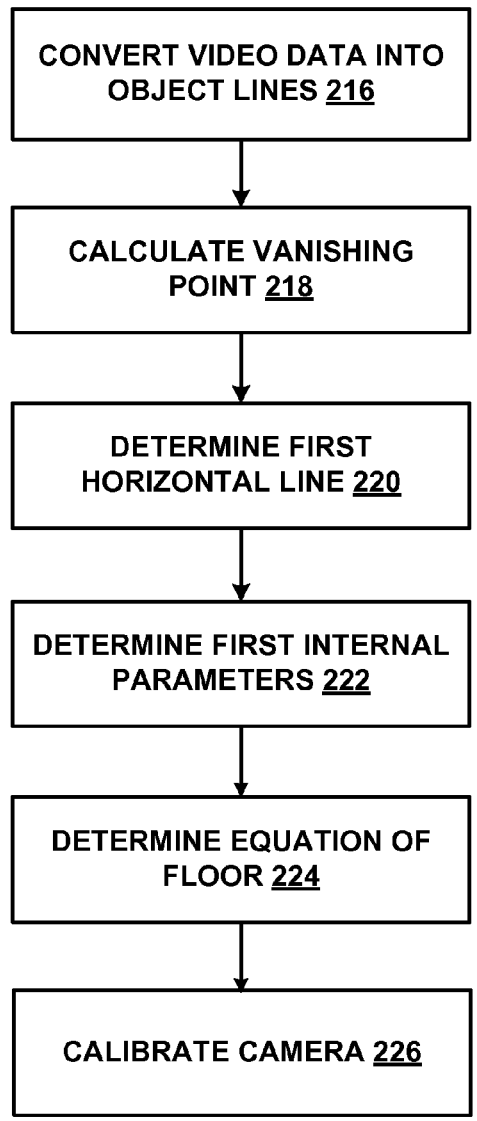
FIG. 2b illustrates a more detailed description of a portion of FIG. 2a in accordance with aspects of the subject matter disclosed herein.

FIG. 2b illustrates a more detailed flow diagram for developing a model as described in 212 of FIG. 2a. At 216 the video data received from the camera or other video monitoring device to be calibrated, taken in a particular fixed location, is converted into a set of object lines. Each of the object lines in the set of object lines may have associated with it a length and an orientation. As described above, only moving objects may be selected for conversion into lines. The length or size of the line and its orientation may be calculated by observing the movement of the object and deriving measurements therefrom. Orientation of the object may be calculated using second order Moments. Objects from the edge of the image may be excluded from conversion. Data stored for each object converted into a line may include length, orientation and original object index and time.

At 218, the vanishing point may be calculated. Using an algorithm such as but not limited to the RANSAC algorithm described above, data that does not fit a proposed model may be removed from the set of converted objects and a vanishing point and a subset of object lines not including the removed objects may be returned.

At 220, a first approximation of a horizontal vanishing line may be determined. For pairs of object lines, the intersection of lines passing through end points (e.g., top and bottom points or right and left side points) for lines pairs originating from the same object may be determined and a line may be defined through the intersection points using the Hough algorithm, least squares or other algorithm to determine the vanishing line.

At 222, a first approximation of camera internal parameters may be determined as described above. At 224, the equation of the floor and the internal camera parameters may be determined as described above. At 226, the camera may be calibrated in accordance with the internal camera parameters.

Example of a Suitable Computing Environment

Figure 3:
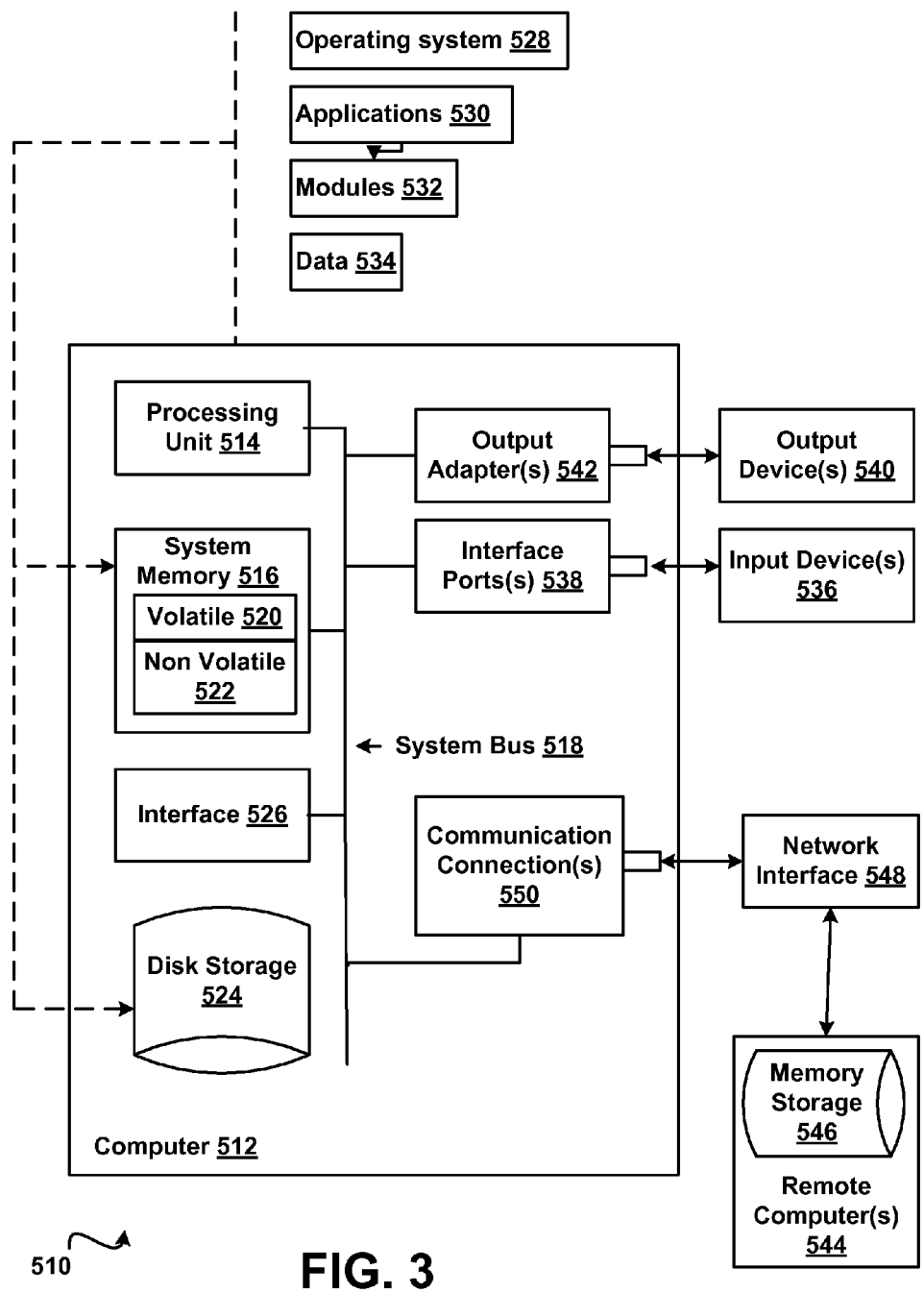
FIG. 3 is a block diagram of an example of a computer on which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512. Disk storage 524 may be connected to the system bus 518 through a non-removable memory interface such as interface 526.

It will be appreciated that FIG. 3 describes software that can act as an intermediary between users and computer resources. This software may include an operating system 528 which can be stored on disk storage 524, and which can control and allocate resources of the computer system 512.

System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the disclosed principles of the systems and methods. All such modifications and variations are intended to be included herein within the scope of this disclosure and the present disclosure and protected by the following claims.

The invention claimed is:

1. An automated calibration system comprising:
a video monitoring device;
a recorder that receives video data from a camera; and
an auto-calibration module that receives historical calibration video data from the video monitoring device and returns output to calibrate the video monitoring device, the output comprising internal parameters, vertical vanishing point, horizontal vanishing line, an equation for a floor, the output providing a model from which objects whose image is captured by the video monitoring device are analyzed.

2. The system of claim 1, further comprising the video monitoring device to be calibrated according to the internal parameters, the video monitoring device comprising a camera.

3. The system of claim 1, wherein the output to calibrate the video monitoring device is associated with the video monitoring device providing the historical calibration video data and a fixed location in which the video monitoring device is positioned when the historical calibration video data is collected.

4. The system of claim 1, wherein the auto-calibration module calculates the output by:
converting the historical video data into a set of object lines, each line of the set of object lines associated with a length, an orientation and an original object index and time.

5. The system of claim 1, wherein the auto-calibration module calculates the output by:
calculating a vanishing point using a RANSAC algorithm to remove outliers and generate a vanishing point.

6. The system of claim 1, wherein the auto-calibration module calculates the output by:
determining a first approximation of a horizontal vanishing line.

7. The system of claim 1, wherein the auto-calibration module calculates the output by:
determining a first approximation of internal parameters for the video monitoring device; determining an equation of the floor; and
determining a final set of internal parameters and setting the internal parameters of the video monitoring device to the final set of internal parameters.

8. A method of calibrating a camera comprising:
receiving historical video data collected by a camera to be calibrated;
generating a model for the camera to be calibrated from the historical video data for a fixed location in which the camera was placed when the historical video data was collected;
converting an object of a plurality of moving objects into a set of object lines, wherein each object line of the set of object lines is associated with a length, an orientation, an original object index and time; and
calibrating the camera by applying the generated model to video data received from the camera at the fixed location.

9. The method of claim 8, further comprising:
calculating the length of an object line of the set of object lines by observing movement of the object line over time and taking measurements of the object line.

10. The method of claim 9, further comprising:
calculating the orientation of the object line using second order Moments.

11. The method of claim 10, further comprising:
calculating a vanishing point for the object line using a RANSAC algorithm wherein object lines not fitting the model are removed from the set of converted objects and a vanishing point and a subset of object lines fitting the model are returned.

12. The method of claim 8, further comprising:
generating a first approximation of a horizontal vanishing line by selecting a line intersecting end points of line pairs originating from an object of the plurality of moving objects and defining a line through intersection points using a least squares algorithm to determine the horizontal vanishing line;
determining a first approximation of camera internal parameters;
determining an equation of a floor; and
determining a final set of internal camera parameters.

13. A computer readable storage medium comprising computer executable program instructions that when executed:
receive historical video data for a video monitoring device to be calibrated, the video monitoring device placed in a fixed position in a fixed location;
generate a model for the video monitoring device to be calibrated from the historical video data for the fixed position in the fixed location in which the video monitoring device was placed when the historical video data was collected;
generate a first approximation of a horizontal vanishing line for an object by selecting a line intersecting end points of lines pairs originating from the object and defining a line through intersection points using a least squares algorithm to determine the first approximation of the horizontal vanishing line; and
calibrating the camera by applying the generated model to video data received from the video monitoring device at the fixed location.

14. The computer readable storage medium of claim 13, further comprising computer executable program instructions that when executed:
generate the model by:
converting an object of a plurality of moving objects into a set of object lines, wherein each object line of the set of object lines is associated with a length, an orientation, an original object index and time;
calculating the length of an object line of the set of object lines by observing movement of the object line over time and taking measurements of the object line; and
calculating a vanishing point for the object line using a RANSAC algorithm wherein object lines not fitting the model are removed from the set of converted objects and a vanishing point and a subset of object lines fitting the model are returned.

15. The computer readable storage medium of claim 13, comprising further computer executable program instructions that when executed:
determine a first approximation of internal parameters for the video monitoring device.

16. The computer readable storage medium of claim 15, comprising further computer executable program instructions that when executed:
determine an equation of a floor.

17. The computer readable storage medium of claim 13, comprising further computer executable program instructions that when executed:
determine a final set of internal parameters for the video monitoring device.

18. The computer readable storage medium of claim 17, comprising further computer executable program instructions that when executed:
analyze objects detected by the video monitoring device when placed in the fixed position in the fixed location using the generated model.

\* \* \* \* \*